United States Patent [19]

Ziaylek et al.

[11] Patent Number: 5,104,280

[45] Date of Patent: Apr. 14, 1992

[54] APPARATUS FOR USE WITH AN EMERGENCY VEHICLE FOR STORAGE AND RETRIEVAL OF REMOTELY LOCATED EMERGENCY DEVICES

[75] Inventors: Michael P. Ziaylek, 3 Brook La., Yardley, Pa. 19067; Antonio L. Sala, Marlton, N.J.; Kenneth P. Wickham, East Greenville; George Wisser, Jr., Philadelphia, both of Pa.

[73] Assignee: Michael P. Ziaylek, Yardley, Pa.

[21] Appl. No.: 642,750

[22] Filed: Jan. 18, 1991

[51] Int. Cl.⁵ .................. B60R 9/048; B60P 3/40
[52] U.S. Cl. .................. 414/462; 414/680; 414/917; 280/4
[58] Field of Search ............. 414/462, 917, 921, 556, 414/551, 680; 182/127, 17, 63; 224/323, 310, 326; 280/4, 762, 763.1, 764.1, 765.1, 766.1

[56] References Cited

U.S. PATENT DOCUMENTS

| | | | |
|---|---|---|---|
| 1,890,940 | 12/1932 | Fox | 280/4 |
| 1,898,826 | 2/1933 | Fox | 414/462 |
| 2,533,771 | 12/1950 | DeFrees | 414/462 |
| 3,013,681 | 12/1961 | Garnett . | |
| 3,058,607 | 10/1962 | Kiley | 414/462 |
| 3,700,123 | 10/1972 | Corley | 414/917 X |
| 3,703,968 | 11/1972 | Uhrich et al. | 414/680 |
| 3,717,271 | 2/1973 | Bargman | 414/917 X |
| 3,963,136 | 6/1976 | Spanke | 414/462 |
| 4,021,070 | 5/1977 | Shea | 414/917 X |
| 4,054,185 | 10/1977 | Stedman | 414/917 X |
| 4,808,056 | 2/1989 | Oshima | 414/462 |
| 4,826,387 | 5/1989 | Audet | 414/462 |
| 4,838,753 | 6/1989 | Gehman et al. | 414/917 X |
| 4,844,490 | 7/1989 | Kohler | 414/462 X |
| 4,887,750 | 12/1989 | Dainty | 414/462 X |
| 4,995,781 | 2/1991 | Herzog | 414/680 |

FOREIGN PATENT DOCUMENTS

2622160 4/1989 France .................. 414/462

*Primary Examiner*—Robert J. Spar
*Assistant Examiner*—Brian K. Dinicola
*Attorney, Agent, or Firm*—Sperry, Zoda & Kane

[57] ABSTRACT

An apparatus particularly usable with an emergency vehicle for storage thereon and facilitating removal of remotely located emergency devices such as ladders, tanks or hoses and the like including a mounting bracket fixedly secured to the vehicle with at least two extension arms extending outwardly therefrom and pivotally secured with respect to the mounting bracket at locations vertically and laterally spaced from one another. An upper suspension bracket is pivotally secured to the extension arms at the opposite end from the mounting bracket and in order to facilitate movement of the extension arms from a storage position vertically extending upwardly above the mounting bracket to a retrieval position laterally extending outwardly from the mounting bracket to facilitate access to the emergency device such as a ladder. There is no rotation of the upper suspension bracket during movement from the storage position to the retrieval position and vice versa with respect to the mounting bracket. Thus, an emergency device such as a ladder can be maintained in the vertically extending position during movement from the upper storage position to the lower retrieval position to facilitate removal thereof.

10 Claims, 6 Drawing Sheets

APPARATUS FOR USE WITH AN EMERGENCY VEHICLE FOR STORAGE AND RETRIEVAL OF REMOTELY LOCATED EMERGENCY DEVICES

BACKGROUND OF THE INVENTION

1. Field Of The Invention

The present invention deals with the field of devices usable for facilitating storage of emergency equipment such as ladders upon emergency vehicles such as fire engines. Dimensions of spacing of equipment upon fire engines is very critical due to the limited amount of space available. Most fire engines are equipped with a shelf at the laterally outwardmost positions of the top of the rear portion of the truck. This shelf is normally thirteen to fifteen inches in horizontal dimension. The present invention provides a means for storage of ladders utilizing this narrow lateral storage position.

With such a configuration it is necessary to provide a means for retrieval of the ladder from this remote location to a lower position adjacent the side portions of the rear of the fire truck at a level directly accessible to fire personnel. The present invention provides an apparatus for achieving this retrieval in a rapid manner which can be manually or automatically powered.

2. Description Of The Prior Art

Prior art devices for facilitating removal of emergency equipment from emergency vehicles and in particular for removing storage of elongated items such as ladders with respect to a fire truck are shown in U.S. Pat. No. 1,898,826 issued Feb. 21, 1933 to Charles H. Fox on a Fire Engine; U.S. Pat. No. 2,533,771 issued Dec. 12, 1950 to Joseph H. DeFrees on a Vented Closure For Milk Tank Manholes; U.S. Pat. No. 3,013,681 issued Dec. 19, 1961 to Edward V. Garnett on a Device For Storage Of Elongated Articles On A Vehicle and U.S. Pat. No. 4,844,490 issued July 4, 1989 to Richard E. Kohler on a Fire Truck Ladder Support.

SUMMARY OF THE INVENTION

The present invention provides an apparatus for use within an emergency vehicle for storage and retrieval of remotely located emergency devices including a mounting bracket adapted to be fixedly secured with respect to the emergency vehicle such that it defines a first mounting position and a second mounting position located thereon. These mounting positions are preferably both vertically and horizontally spatially positioned with respect to one another to provide an offset point of pivotal securement for two extension arms.

A first extension arm construction preferably formed of aluminum is pivotally secured with respect to the first mounting position of the mounting bracket. This first extension arm preferably includes a first inner end and a first outer end. The first inner end is pivotally secured with respect to the mounting bracket at the first mounting position defined thereon. The first extension arm is also movable between a storage position extending generally vertically upwardly with respect to the mounting bracket and a retrieval position extending generally horizontally outwardly therefrom.

A second extension arm is also preferably formed of aluminum and is pivotally secured with respect to the second mounting position of the mounting bracket. The second extension arm includes a second inner end and a second outer end. The second inner end is pivotally secured preferably with respect to the mounting bracket at the second mounting position. This second extension arm is preferably movable between a storage position extending generally upwardly with respect to the mounting bracket and a retrieval position extending generally outwardly laterally therefrom.

An upper suspension bracket is pivotally secured with respect to the first outer end of the first extension arm and with respect to the second outer end of the second extension arm. This upper suspension bracket maintains a horizontally extending orientation without allowing any rotation thereof with respect to the mounting bracket in order to facilitate a continuous vertical orientation of a ladder or other emergency device retained with respect thereto during movement between the upper storage position and the lower retrieval position.

A device retaining bracket is fixedly secured with respect to the upper suspension bracket and is adapted to retain emergency devices with respect thereto in such a manner as to be movable therewith between the storage position and the retrieval position. The device retaining bracket preferably is of a general C-shape in order to facilitate retainment of emergency devices thereon and to allow for storage of somewhat bulky emergency devices such as ladders within a very narrow lateral space in order to facilitate confinement within the narrow shelf areas often found on the upper lateral sides of fire trucks.

The apparatus of the present invention may be manually operated to be movable between the storage and retrieval positions. Alternatively the apparatus can be electrically powered. In either configuration a push arm means which may be electrically or manually powered is operatively attached with respect to the first extension arm and with respect to the mounting bracket. The push arm includes a push arm outer end and a push arm inner end. The push arm outer end is pivotally attached with respect to the first extension arm and the push arm inner end is pivotally secured with respect to the mounting bracket. The electrical or manual push arm is operative to vary the longitudinal length thereof responsive to electrical powering. The push arm is movable between a storage position and a retrieval position in order to urge like movement therewith of the first extension arm, the second extension arm, the upper suspension bracket, the device retaining bracket and the ladder or other emergency device retained thereby.

The present invention further includes an adjustment bracket which is movably secured with respect to the first extension arm. The push arm outer end is pivotally secured with respect to the adjustment bracket in such a manner as to be pivotally secured with respect to the first extension arm of the adjustment bracket with respect to the first extension arm which provides adjustment of the spacing between the mounting bracket and the first extension arm along the push arm. The adjustment bracket includes an adjustment screw movably secured with respect thereto and in abutment with respect to the first extension arm to control relative positioning between the adjustment arm and the first extension arm. This element of adjustment facilitates correct longitudinal orientation of the push arm between the mounting bracket and the first suspension arm to control spacing therebetween to facilitate accurate movement of the apparatus of the present invention between the storage position and the retrieval position and in order to assure the maintenance of horizontal orientation of the suspension bracket with respect to the mounting bracket during the path of movement.

The present invention further includes a plurality of flexibly resilient retaining members attached with respect to the device retaining bracket to facilitate detachable retainment of emergency devices with respect thereto and to facilitate removal in a rapid fashion when desired during emergency situations.

Other emergency devices can be retained with respect to the device retaining bracket of the present invention such as hoses or tanks. However, it has been found that the major bulky emergency device necessitating remote storage are various types of ladders.

It is an object of the present invention to provide an apparatus for use with an emergency vehicle for storage and retrieval of remotely located emergency devices wherein quick and efficient retrieval is achievable.

It is an object of the present invention to provide an apparatus for use with an emergency vehicle for storage and retrieval of remotely located emergency devices wherein powering of movement to the retrieval position is manually operated.

It is an object of the present invention to provide an apparatus for use with an emergency vehicle for storage and retrieval of remotely located emergency devices wherein powering to the retrieval position is electrically powered automatically.

It is an object of the present invention to provide an apparatus for use with an emergency vehicle for storage and retrieval of remotely located emergency devices wherein initial capital outlay for equipment is minimized.

It is an object of the present invention to provide an apparatus for use with an emergency vehicle for storage and retrieval of remotely located emergency devices wherein maintenance requirements are minimized.

It is an object of the present invention to provide an apparatus for use with an emergency vehicle for storage and retrieval of remotely located emergency devices wherein maintenance costs are minimized.

It is an object of the present invention to provide an apparatus for use with an emergency vehicle for storage and retrieval of remotely located emergency devices wherein use of aluminum for major movement parts prevents rust and greatly extends the lifetime of operation.

It is an object of the present invention to provide an apparatus for use with an emergency vehicle for storage and retrieval of remotely located emergency devices wherein ladders and other emergency devices can be conveniently stored in a remote location and retrieved immediately based upon need.

It is an object of the present invention to provide an apparatus for use with an emergency vehicle for storage and retrieval of remotely located emergency devices wherein the total lateral movement in the vertical direction is no less than thirty-one (31) inches.

It is an object of the present invention to provide an apparatus for use with an emergency vehicle for storage and retrieval of remotely located emergency devices wherein the total movement time from the storage position to the retrieval position is no greater than eleven (11) seconds.

It is an object of the present invention to provide apparatus with a emergency vehicle for storage and retrieval of remotely located emergency devices wherein a C-shaped device retaining bracket is achieved to minimize total lateral dimension when used with any type of ladder to the horizontal lateral shelf limit of thirteen (13) inches.

It is an object of the present invention to provide an apparatus for use with an emergency vehicle for storage and retrieval of remotely located emergency devices wherein vertical orientation of bulky emergency devices such as ladders can be maintained during the entire term of movement from the storage position to the retrieval position and back.

It is an object of the present invention to provide an apparatus for use with an emergency vehicle for storage and retrieval of remotely located emergency devices wherein the height above the mounting surface to the top of the unit is less than thirty (30) inches.

It is an object of the present invention to provide an apparatus for use with an emergency vehicle for storage and retrieval of remotely located emergency devices wherein various shapes of emergency devices can be retained within the device retaining bracket without requiring any design changes of the bracket itself.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides an apparatus for use with an emergency vehicle 10 to facilitate the retainment of emergency devices 12 such as ladders 14 in remote locations and facilitating retrieval therefrom.

Figure 1:
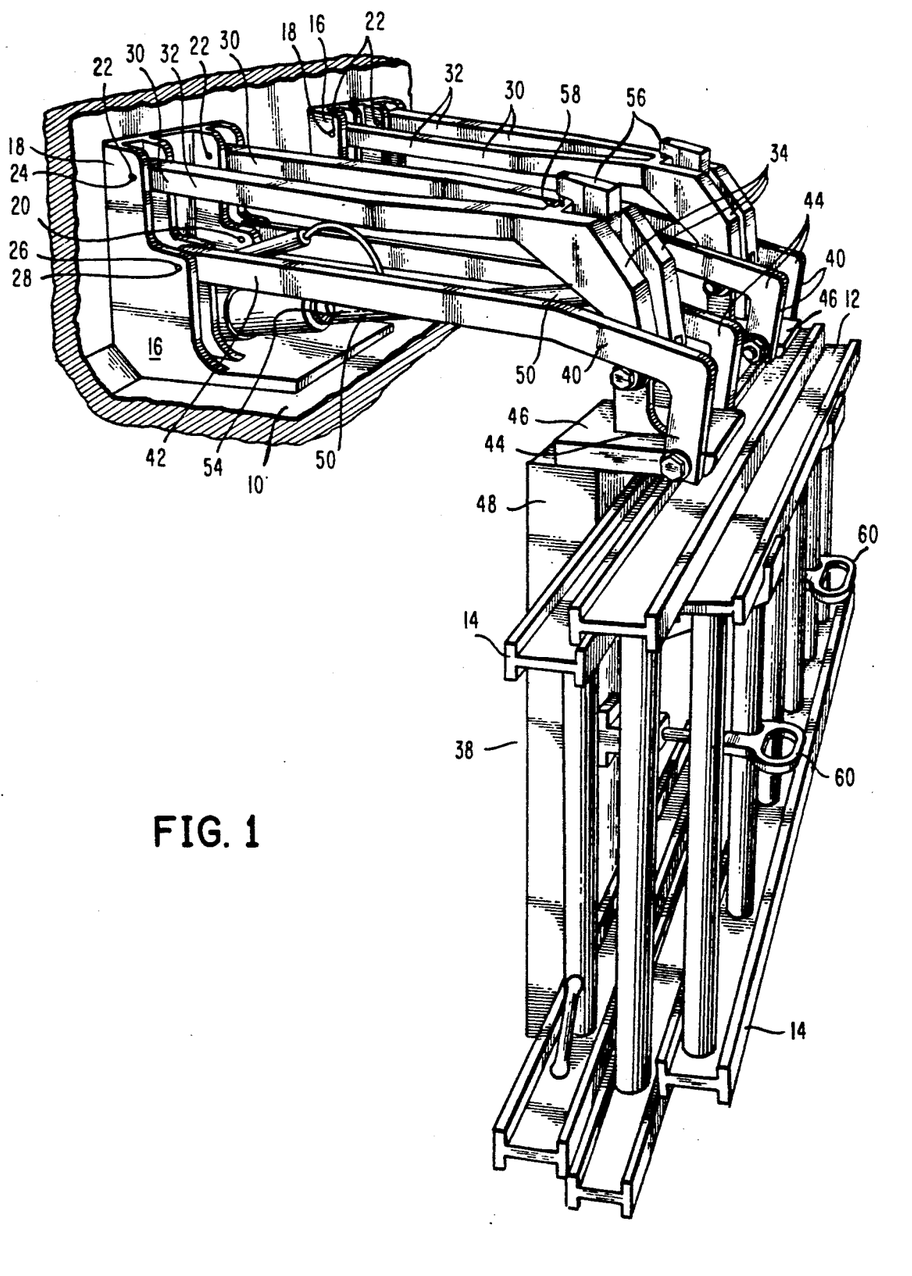
FIG. 1 is a front perspective illustration of an embodiment of the present invention.
Figure 2:
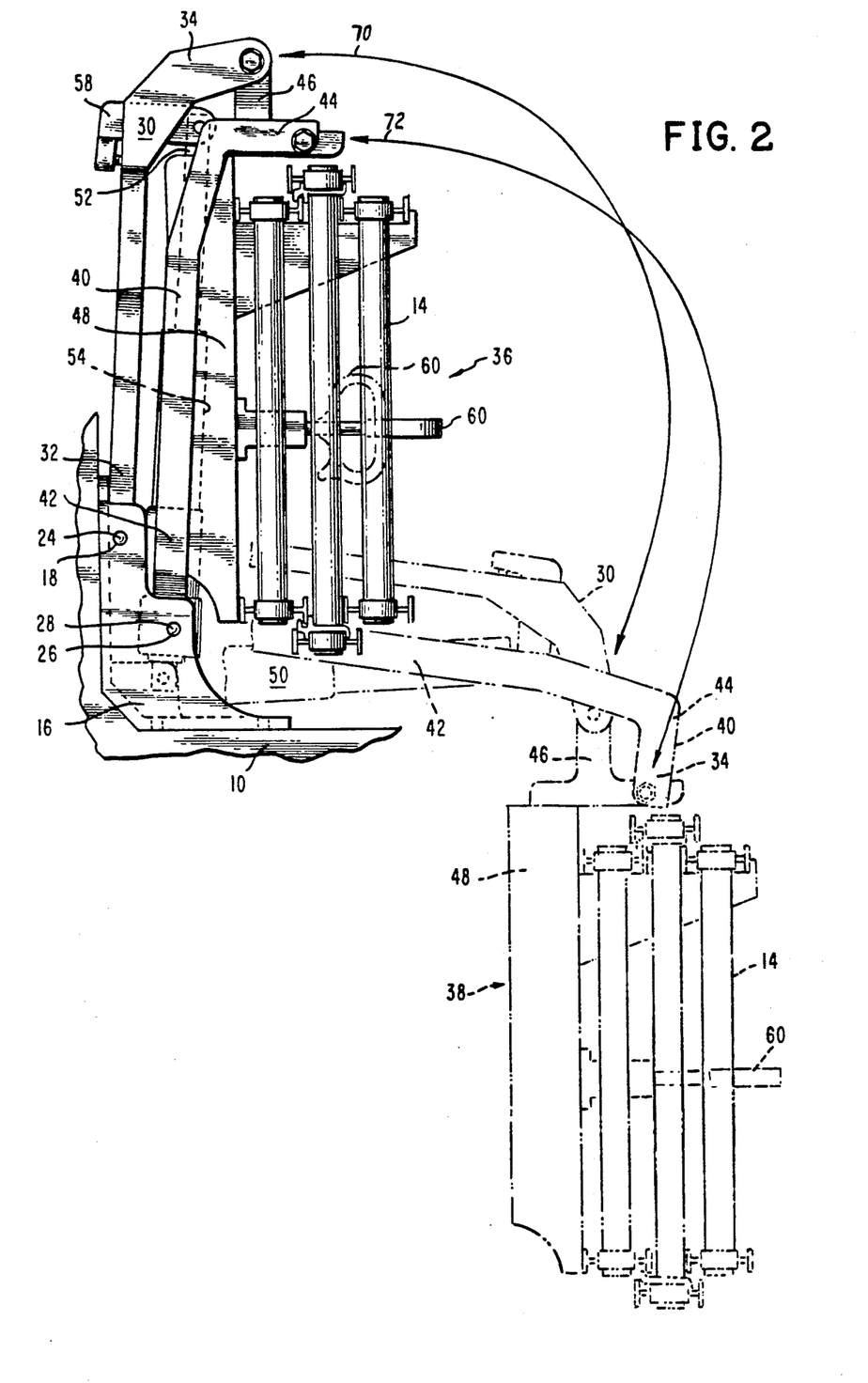
FIG. 2 is a side plan view of an embodiment of the present invention positioned in the storage position showing in phantom outline the path of movement to the retrieval position.
Figure 3:
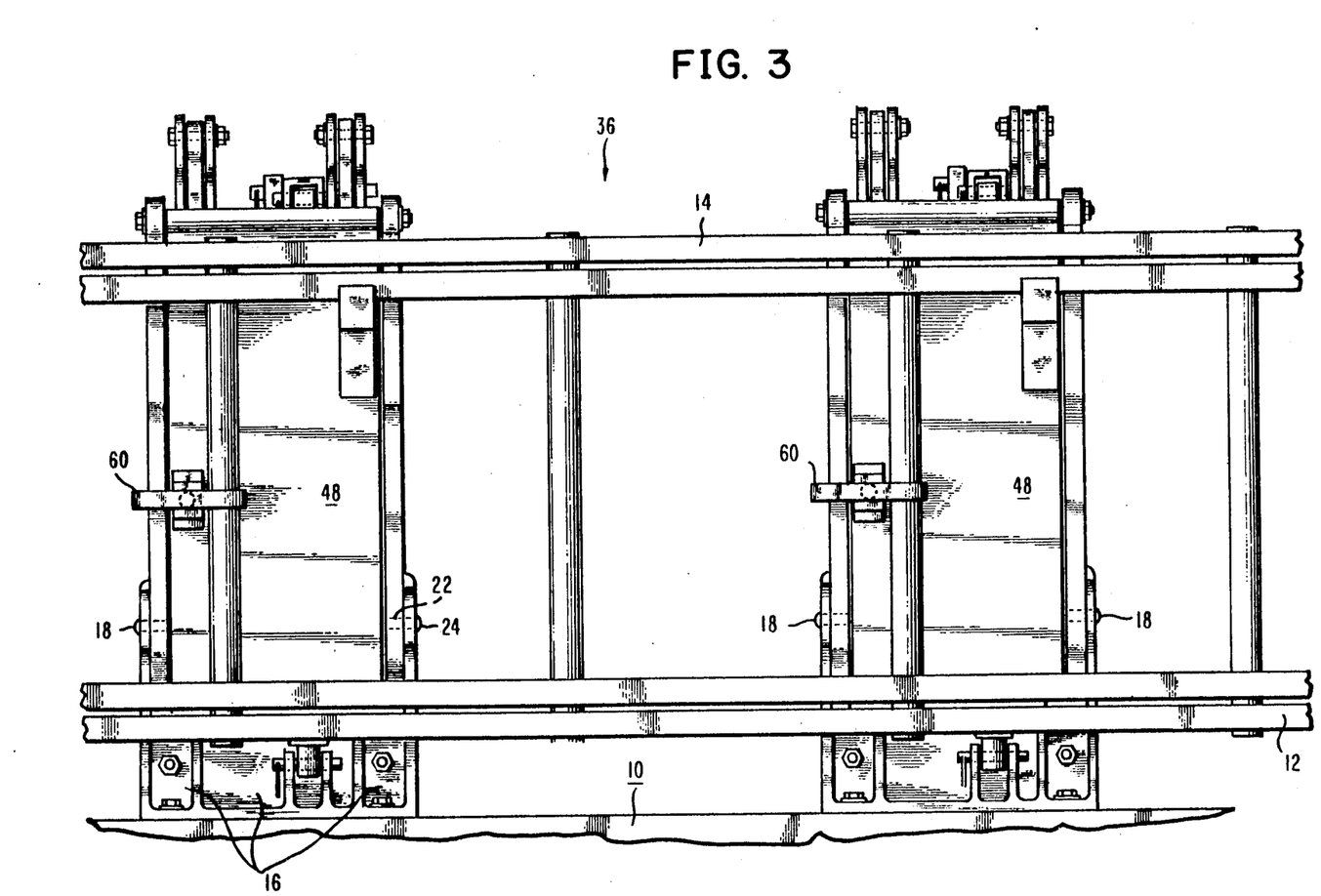
FIG. 3 is a front plan view of the embodiment shown in FIG. 1 in the position shown in FIG. 2.
Figure 4:
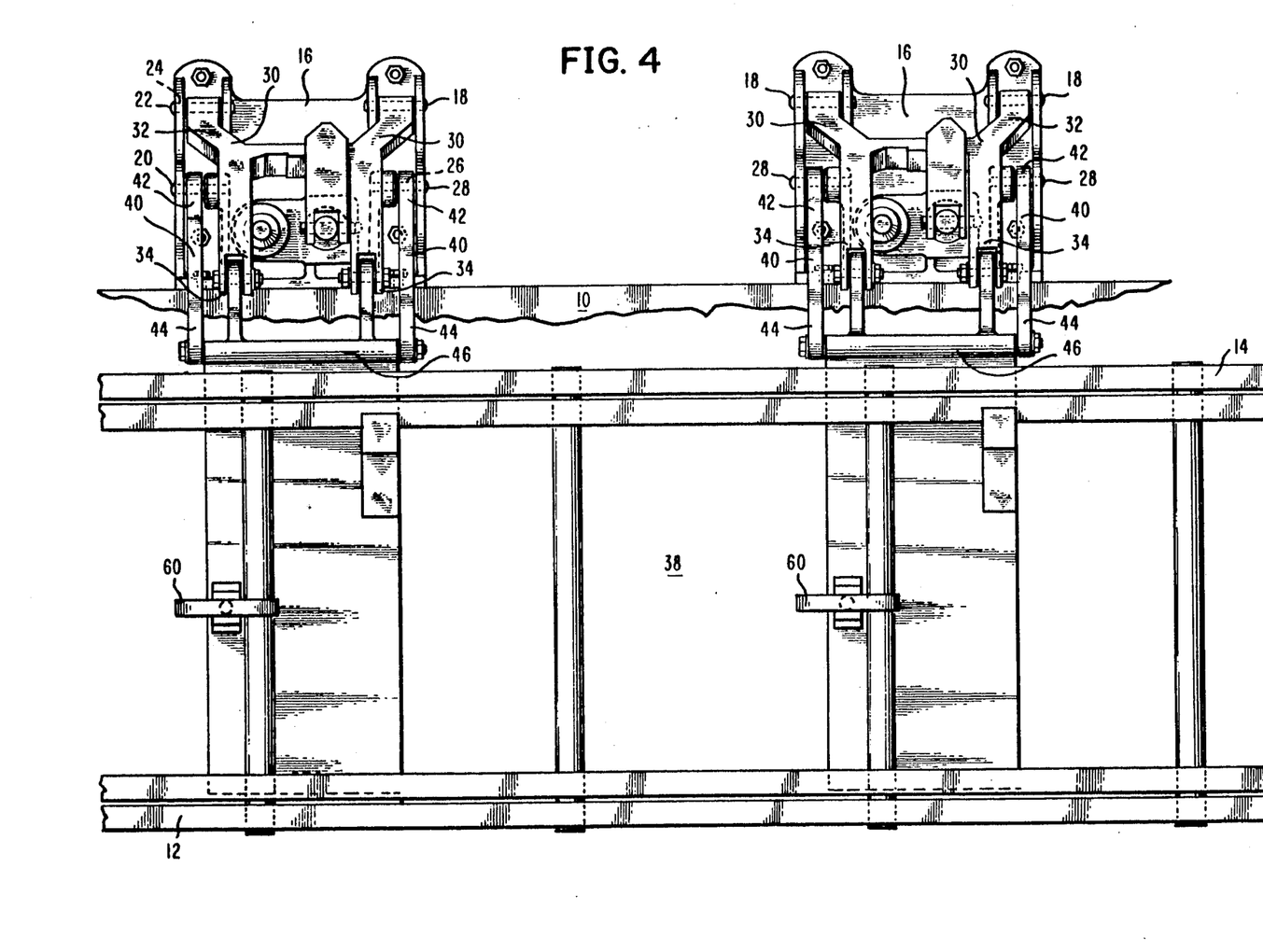
FIG. 4 is a front plan view of the embodiment shown in FIG. 1 in the position shown in FIG. 1.
Figure 5:
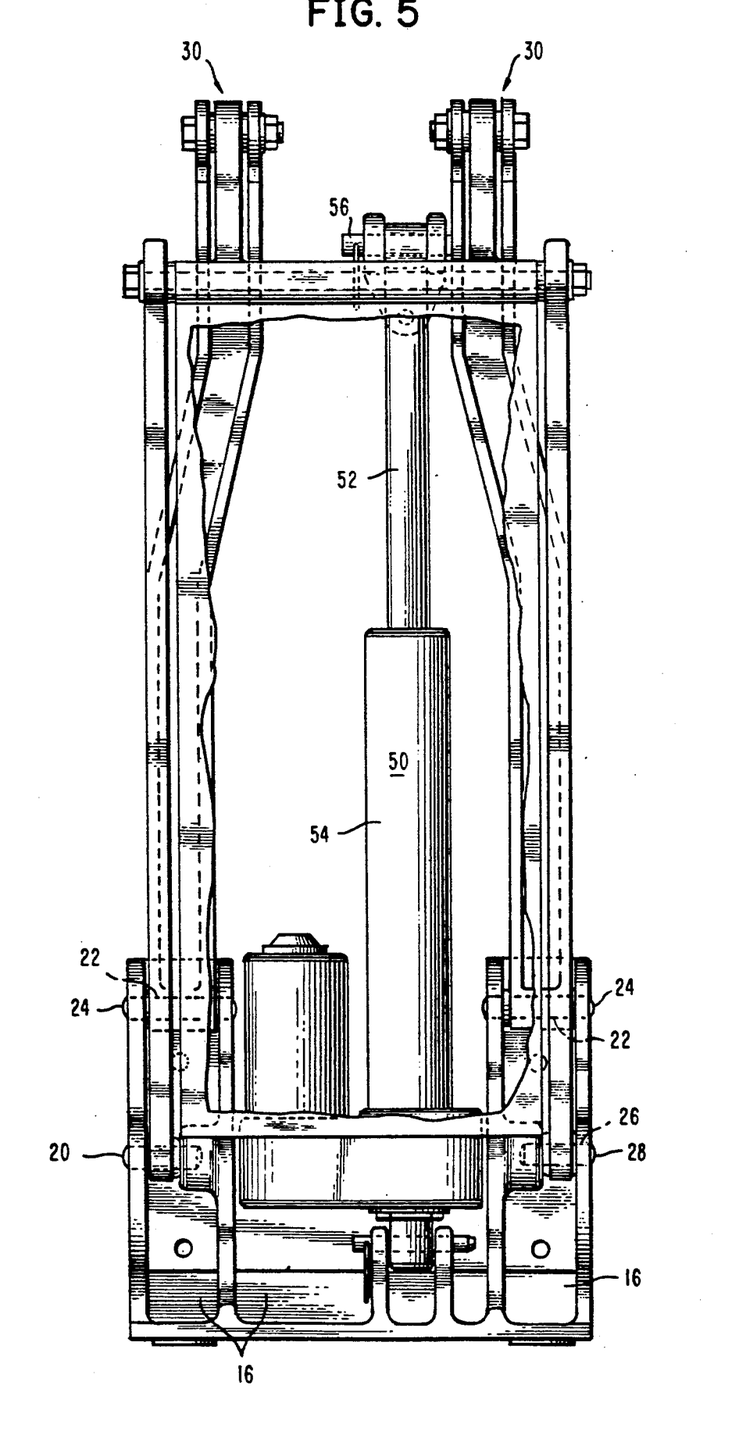
FIG. 5 is a portion of FIG. 4 shown broken away to fully display the push arm configuration.
Figure 6:
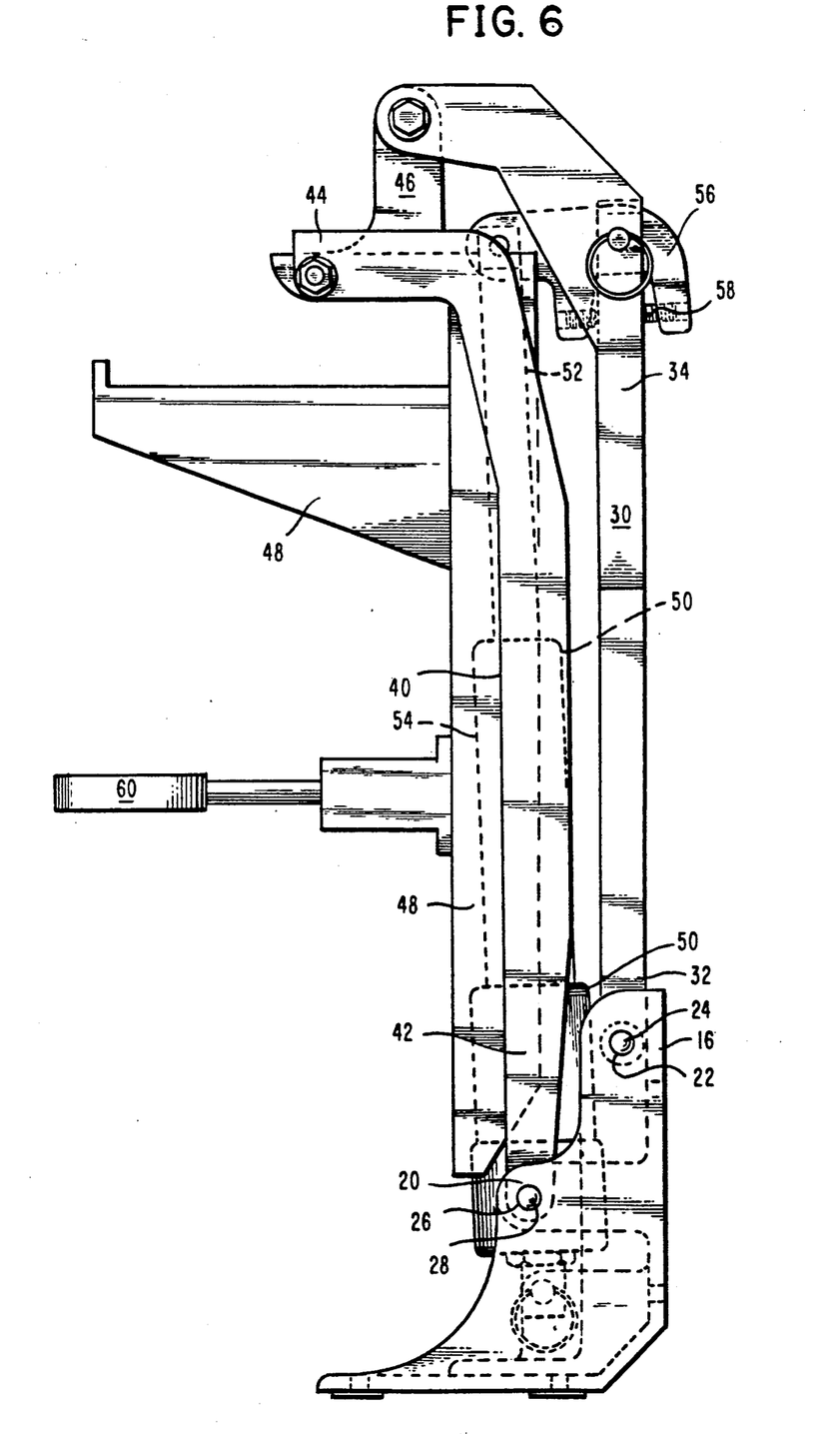
FIG. 6 is a side plan view of the embodiment shown in FIG. 2.

The emergency vehicle 10 preferably will normally be a fire truck wherein the ladder 14 can be positioned in a storage position 36 as shown best in FIG. 2 and can be movable to a retrieval position 38 as shown best in FIGS. 1 and 2. The storage position 36 is normally located above the emergency vehicle 10 in order to minimize the lateral width of the vehicle and is movable to the retrieval position 38 to facilitate removal of the ladder or other emergency devices 12 quickly during emergency situations on location.

There are also significant spacing limitations on an emergency vehicle 10 since many devices must be made readily accessible to emergency personnel at the time of treatment of an emergency. The remote positioning of large articles above the rear portion of the truck in the storage position 36 is a distinct advantage which facilitates storage of the many different types of equipment needed in such situations.

In particular the apparatus of the present invention includes a mounting bracket means 16 adapted to be fixedly secured with respect to the emergency vehicle 10 normally upon shelves commonly found on the upper outermost portions of the rear sections of these vehicles. These shelves have limited lateral width being normally between 11 and 15 inches in width and as such the present invention has specific lateral dimensional limitations when located in the storage position 36.

Mounting bracket 16 preferably includes a first mounting position 18 which may take the form of a first mounting aperture 22 and a first mounting pin 24 extending therethrough in order to pivotally secure the first extension arm means 30 with respect to the mounting bracket 16. In a similar manner a second mounting position 20 is defined on the mounting bracket 16. The second mounting position 20 preferably takes the form of a second mounting aperture 26 which may include a second mounting pin 28 extending therethrough to pivotally secure the second extension arm means 40 with respect to the mounting bracket means 16.

With this configuration the first extension arm means 30 and the second extension arm means 40 are both pivotally secured with respect to the mounting bracket 16 at the first mounting position 18 and second mounting position 20, respectively. The first extension arm means includes a first inner end means 32 and a first outer end means 34. The first inner end means 32 is the end which is pivotally secured with respect to the first mounting position 18. In a similar manner the second extension arm means 40 includes a second inner end means 42 and a second outer end means 44 wherein the second inner end means 42 is pivotally secured with respect to the second mounting position 20.

An upper suspension bracket means 46 is pivotally secured with respect to the second outer end means 34 of first extension arm means 30 and also with respect to the second outer end means 44 of the second extension arm means 40. The orientation of the upper suspension bracket 46 with respect to the mounting bracket 16 during movement from the storage position 36 to the retrieval position 38 and back is of particular significance. That is, by the pre-chosen positioning of the first mounting position 18 and the second mounting position 20 being spatially disposed upwardly and laterally spaced from one another facilitates maintenance of the upper suspension bracket 46 in a constant lateral orientation during all points of movement between the storage and retrieval positions 36 and 38 respectively. In this manner a ladder or other emergency device which is secured with respect to the upper suspension bracket 46 and that is extending downwardly therefrom will be maintained in this vertically extending orientation while in the storage position 36 and in the retrieval position 38 and at all points of movement therebetween. This constancy of orientation of the emergency device 12 or ladder 14 with respect to the vehicle 10 is achieved due to the parallelogram defined by the first extension arm means 30 and the second extension arm means 40 always extending generally parallel with respect to one another and the vertical and horizontal spatial positioning of the first mounting position 18 with respect to the second mounting position 20 as well as the vertical and horizontal spatial positioning of the pivotal connection of the first outer end 34 with respect to the upper suspension bracket and the second outer end pivotal connection with respect to the upper suspension bracket. This orientation creates a parallelogram of movement with the opposite sides always extending generally parallel with respect to one another to thereby facilitate maintenance of orientation of the emergency device 12 at all points of movement between the positions 36 and 38.

A device retaining bracket means 48 is preferably fixedly secured with respect to the upper suspension bracket means 46. Preferably the device retaining bracket means 48 provides a generally C-shaped configuration in order to facilitate placement of the emergency device 12 such as a ladder 14 within the internal open area of the C to minimize lateral dimensions thereof during positioning especially within the storage position 36 but also at all times along the path of movement.

The device retaining bracket means 48 may include one or more flexibly resilient retaining members 60 to facilitate retainment of the emergency device 12 with respect to the device retaining bracket means 48 and the upper suspension bracket 46. Movement of the apparatus of the present invention between the storage position 36 and the retrieval position 38 can be manually powered. Alternatively it is preferred that some type of automatic powering be provided such as an electrical powering means. To achieve such movement a push arm means 50 may be operatively secured with respect to the apparatus. Push arm means 50 preferably includes a push arm outer end 52 and a push arm inner end 54. The push arm inner end 54 is pivotally secured with respect to mounting bracket 16 and the push arm outer end 52 is preferably pivotally attached with respect to the first extension arm means 30.

It is particularly preferable within the present invention to provide a means for adjustment of the positioning of the push arm outer end 52 with respect to the first extension arm means 30. This is provided by the inclusion of an adjustment bracket 56 movably secured with respect to the first extension arm means 30. Preferably adjustment bracket 56 is pivotally movable with respect to the first extension arm means 30. Further preferably the adjustment bracket 56 includes an adjustment screw means 58 positioned in abutment with respect to the first extension arm means 30 and movably secured with respect to adjustment bracket 56. The adjustment screw means can be rotated in order to vary the dimension of positioning of adjustment bracket 56 with respect to the first extension arm means 30. With this configuration it is preferable that the push arm outer end 52 is pivotally secured with respect to the first extension arm means 30 by being pivotally secured with respect to adjustment bracket 56. Since adjustment bracket 56 is adjustably positionable with respect to the first extension arm means 30, a means for adjustment of the total dimension of the attachment distance between the mounting bracket means 16 and the first extension arm means 30 along the push arm 50 is provided.

In operation the present invention will normally have the ladder or other emergency device 12 positioned as shown in FIG. 2 in the storage position 36. When needed the manual or electrical operation will cause the push arm to push outwardly from the emergency vehicle 10 on the first extension arm means 30 thereby causing movement along the lines 70 and 72 shown also in FIG. 2. Line 70 in FIG. 2 shows the path of movement of the first extension arm means 30 between the storage position 36 and the retrieval position 38 whereas line 72 shows the path of movement of second extension arm means 40 between the storage position 36 and the retrieval position 38. In this manner the movable parts including the first extension arm means 30, the second extension arm means 40, the upper suspension bracket 46 and the device retaining bracket 48 as well as the emergency device 12 retained thereby will be moved downwardly along an arcuate path to the retrieval position 38. At that point the flexibly resilient retaining member 60 can be operated by a fireman or other emergency personnel facilitating removal of the emergency device 12 such as a ladder 14. In this manner retrieval of the ladder 14 from the apparatus of the present invention while located in the retrieval position 38 is greatly facilitated. This type of quick and efficient removal is needed during emergency situations for various types of emergency personnel.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An apparatus for use with an emergency vehicle for storage and retrieval of remotely located emergency devices comprising:
    a) a mounting bracket means adapted to be fixedly secured with respect to the emergency vehicle;
    b) a first extension arm means pivotally secured with respect to said mounting bracket means, said first extension arm means including a first inner end means and a first outer end means, said first inner end means being pivotally secured to said mounting bracket means, said first extension arm means being movable between a first storage position extending generally upwardly from said mounting bracket and a first retrieval position extending generally outwardly laterally with respect to said mounting bracket;
    c) a second extension arm means pivotally secured to said mounting bracket means, said second extension arm means including a second inner end means and a second outer end means, said second inner end means being pivotally secured to said mounting bracket means, said second extension arm means being movable between a second storage position extending generally upwardly from said mounting bracket and a second retrieval position extending generally outwardly laterally with respect to said mounting bracket;
    d) an upper suspension bracket means pivotally secured to said first outer end means of said first extension arm means and to said second outer end means of said second extension arm means, said upper suspension bracket means being movable between a third storage position and a third retrieval position while maintaining vertically extending orientation of said upper suspension bracket means;
    e) a device retaining bracket means fixedly secured to said upper suspension bracket and adapted to retain emergency devices thereadjacent to be movable therewith between the storage position and the retrieval position as desired; and
    f) a push arm means operatively attached to said first extension arm means and with respect to said mounting bracket means, said push arm means operative to vary the longitudinal length thereof, said push arm means being movable between a fourth storage position and a fourth retrieval position urging movement therewith of said first extension arm means, said second extension arm means, said upper suspension bracket means, said device retaining bracket means and any emergency device retained thereto, said push arm means including a push arm outer end means and a push arm inner end means with said push arm outer end means being pivotally attached to said first extension arm means and said push arm inner end means being pivotally secured to said mounting bracket means;
    g) an adjustment bracket secured to said first extension arm means and being adjustably positionable with respect thereto, said adjustment bracket being C-shaped and extending about said first extension arm means;
    h) a first adjustment screw means movably secured to and extending through said adjustment bracket into abutment with said first extension arm means to control relative positioning between said adjustment bracket and said first extension arm means; and
    i) a second adjustment screw means movably secured to and extending through said adjustment bracket at a location opposite from said first adjustment screw means into abutment with said first extension arm means to further control relative positioning between said adjustment bracket and said first extension arm means.

2. An apparatus for use with an emergency vehicle for storage and retrieval of remotely located emergency devices as defined in claim 1 wherein said upper suspension bracket means and said device retaining bracket means maintain vertical orientation thereof during movement of said upper suspension bracket means between said third storage position and said third retrieval position.

3. An apparatus for use with an emergency vehicle for storage and retrieval of remotely located emergency devices as defined in claim 1 wherein said mounting bracket means defines a first mounting position and a second mounting position thereon, said first extension arm means being mounted on said mounting bracket means at said first mounting position and said second extension arm means being mounted on said mounting bracket means at said second mounting position.

4. An apparatus for use with an emergency vehicle for storage and retrieval of remotely located emergency devices as defined in claim 3 wherein said first mounting position and said second mounting position of said mounting bracket means are located on said mounting bracket means at positions spaced from one another.

5. An apparatus for use with an emergency vehicle for storage and retrieval of remotely located emergency devices as defined in claim 1 wherein said first storage position and said second storage position are positioned vertically above said mounting bracket means and wherein said first retrieval position and said second retrieval position are horizontally outward therefrom.

6. An apparatus for use with an emergency vehicle for storage and retrieval of remotely located emergency devices as defined in claim 1 wherein said device retaining bracket means is generally C-shaped to facilitate retainment of emergency devices thereon.

7. An apparatus for use with an emergency vehicle for storage and retrieval of remotely located emergency devices as defined in claim 1 wherein the retrieval position is oriented downwardly and outwardly with respect to said storage position.

8. An apparatus for use with an emergency vehicle for storage and retrieval of remotely located emergency devices as defined in claim 1 wherein said first extension arm means and said second extension arm means are made of aluminum material.

9. An apparatus for use with an emergency vehicle for storage and retrieval of remotely located emergency devices as defined in claim 1 wherein said device retaining bracket means includes at least one individual retaining member to facilitate retaining of emergency devices with respect thereto.

10. An apparatus for use with an emergency vehicle for storage and retrieval of remotely located emergency devices comprising:
  a) a mounting bracket means adapted to be fixedly secured to the emergency vehicle, said mounting bracket means defining a first mounting position and a second mounting position being spatially separated with respect to one another;
  b) a first extension arm means of aluminum and being pivotally secured to said first mounting position of said mounting bracket means, said first extension arm means including a first inner end means and a first outer end means, said first inner end means being pivotally secured to said mounting bracket means, said first extension arm means being movable between a first storage position extending generally vertically upwardly from said mounting bracket and a first retrieval position extending generally horizontally outwardly with respect to said mounting bracket;
  c) a second extension arm means of aluminum and being pivotally secured to said second mounting position of said mounting bracket means, said second extension arm means including a second inner end means and a second outer end means, said second inner end means being pivotally secured to said mounting bracket means, said second extension arm means being movable between a second storage position extending generally upwardly from said mounting bracket and second retrieval position extending generally outwardly laterally from said mounting bracket;
  d) an upper suspension bracket means pivotally secured to said first outer end means of said first extension arm means and to said second outer end means of said second extension arm means, said upper suspension bracket means maintaining vertical orientation thereof during movement of said first extension arm means between said first storage position and said first retrieval position and during movement of said second extension arm means between said second storage position and said second retrieval position;
  e) a device retaining bracket means fixedly secured to said upper suspension bracket and adapted to retain emergency devices thereadjacent to be movable therewith between the storage position and the retrieval position as desired, said device retaining bracket means being generally C-shaped to facilitate retainment of emergency devices thereon;
  f) a push arm means operatively attached to said first extension arm means and to said mounting bracket means, said push arm means including a push arm outer end means and a push arm inner end means, said push arm outer end means being pivotally attached to said first extension arm means and said push arm inner end means being pivotally secured to said mounting bracket means, said push arm means operative to vary the longitudinal length thereof, said push arm means being movable between an arm storage position and an arm retrieval position urging like movement therewith of said first extension arm means, said second extension arm means, said upper suspension bracket means, said device retaining bracket means and any emergency device retained thereto; and
  g) an adjustment bracket secured to said first extension arm means and being adjustably positionable with respect thereto, said adjustment bracket being C-shaped and extending about said first extension arm means;
  h) a first adjustment screw means movably secured to and extending through said adjustment bracket into abutment with said first extension arm means to control relative positioning between said adjustment bracket and said first extension arm means;
  i) a second adjustment screw means movably secured to and extending through said adjustment bracket at a location opposite from said first adjustment screw means into abutment with said first extension arm means to further control relative positioning between said adjustment bracket and said first extension arm means; and
  j) a plurality of retaining members attached to said device retaining bracket to facilitate retaining of emergency devices with respect thereto.

* * * * *